United States Patent [19]

Yamagata et al.

[11] Patent Number: 4,838,780

[45] Date of Patent: Jun. 13, 1989

[54] CONSTANT SPEED RUNNING CONTROL DEVICE FOR AUTOMOBILE

[75] Inventors: Testuo Yamagata, Bunkyo; Shoji Yamashita, Kawagoe, both of Japan

[73] Assignee: Honda Giken Kogyo Kabushiki Kaisha, Tokyo, Japan

[21] Appl. No.: 137,778

[22] Filed: Dec. 24, 1987

[30] Foreign Application Priority Data

Dec. 24, 1986 [JP] Japan .................................. 61-313807
Dec. 24, 1986 [JP] Japan .................................. 61-313808

[51] Int. Cl.$^4$ .............................................. F02D 11/10
[52] U.S. Cl. ....................................... 123/352; 180/178
[58] Field of Search ................ 123/349, 350, 352, 360, 123/361; 180/178, 179

[56] References Cited

U.S. PATENT DOCUMENTS

| | | | |
|---|---|---|---|
| 4,336,566 | 6/1982 | Noddings et al. | 180/178 X |
| 4,352,402 | 10/1982 | Collonia | 123/352 X |
| 4,495,913 | 1/1985 | Gray | 180/179 X |
| 4,519,361 | 5/1985 | Murakami | 123/361 X |
| 4,569,239 | 2/1986 | Shirley et al. | 180/179 X |
| 4,580,537 | 4/1986 | Uchiyama | 123/352 |
| 4,718,380 | 1/1988 | Katayose et al. | 123/361 X |

FOREIGN PATENT DOCUMENTS 2654533  6/1978  Fed. Rep. of Germany ...... 180/178

*Primary Examiner*—Willis R. Wolfe
*Attorney, Agent, or Firm*—Pollock, VandeSande & Priddy

[57] ABSTRACT

A constant speed running control device is disclosed for use on an automobile or motorcycle which permits automatic constant speed operation at a desired speed by a setting operation, and more particularly, to an improvement in a cancellation system for the automatic constant speed operation. The cancellation system being responsive to a throttle opening change in a closing direction of the engine throttle within a fixed period of time which is greater than a predetermined value or is responsive to irregular combustion in the engine during low operating speeds.

2 Claims, 9 Drawing Sheets

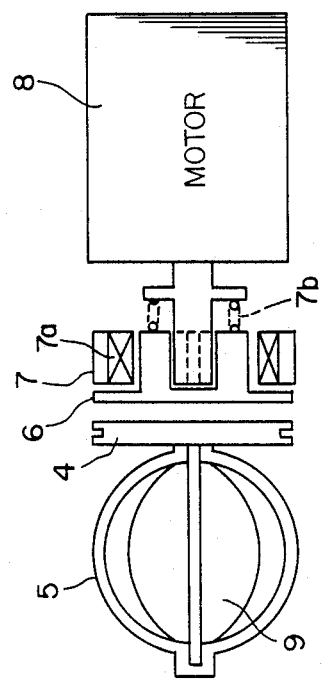
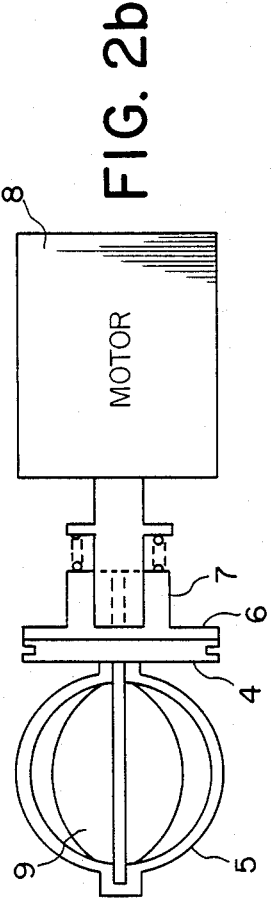

CONSTANT SPEED RUNNING CONTROL DEVICE FOR AUTOMOBILE

FIELD OF THE INVENTION

The present invention relates to a constant speed running control device for an automobile or motorcycle which device permits automatic constant speed operation at a desired speed by a setting operation, and more particularly to an improvement in a cancellation system for automatic constant speed operation.

BACKGROUND OF THE INVENTION

In a constant speed operation device for an automobile or motorcycle, the automatic constant speed operation may be manually cancelled, but, for the sake of convenience, an automatic cancellation system is generally used in combination with such manual cancellation system. For instance, the system disclosed in Japanese Patent Publication No. 61-6032 of the present applicant includes a switch interlocking with the operation of a throttle grip mounted on a handle. The switch gives a cancellation command for cancelling the automatic constant speed operation when the throttle grip is operated in the decelerating direction. The system disclosed in the Japanese Patent Publication No. 52-1887 includes a switch interlocking with the operation of a clutch or brake.

However, the first of the above described prior art devices cancels the automatic constant speed operating condition according to a rotative position of the throttle grip irrespective of the vehicle operating speed, while the second requires operation of the cancelling means to manually drive the automobile. Therefore, it is impossible to obtain a constant speed operation control corresponding to engine performance. I.e., in an engine capable of generating a high torque even at low engine speeds, constant speed operation control may be maintained down to a very low vehicle speed. Accordingly, as far as constant speed operation control is permissible in correspondence with engine performance, it is desired to maintain automatic constant speed operation even after deceleration. On the other hand, it is also desired to cancel the automatic constant speed operation by a decelerating operation in case of an emergency or the like.

SUMMARY OF THE INVENTION

Accordingly, it is an object of the present invention to provide a constant speed operation control device for a vehicle, which device may cancel the automatic constant speed operation in the case of a predetermined decelerating condition such as rapid closing of the throttle grip or when engine combustion becomes irregular at low engine speeds (knocking), thereby enabling stable automatic constant speed control.

According to the invention, in a constant speed operation control device adapted to determine opening of an engine throttle according to an output command signal from a control circuit and maintain a vehicle operating speed at a fixed set value, the control circuit cancels an automatic constant speed operation when a throttle opening change in a closing direction of the engine throttle within a fixed period of time is greater than a predetermined value, or in the event of irregular combustion at low engine speeds.

With this arrangement, the automatic constant speed operation is cancelled only when forced deceleration is greater than a predetermined value, or when there is a possibility of knocking at low engine speeds.

BRIEF DESCRIPTION OF THE DRAWINGS

FIGS. 2a and 2b show details of the device shown in FIG. 1;

DESCRIPTION OF PREFERRED EMBODIMENT

Figure 1:
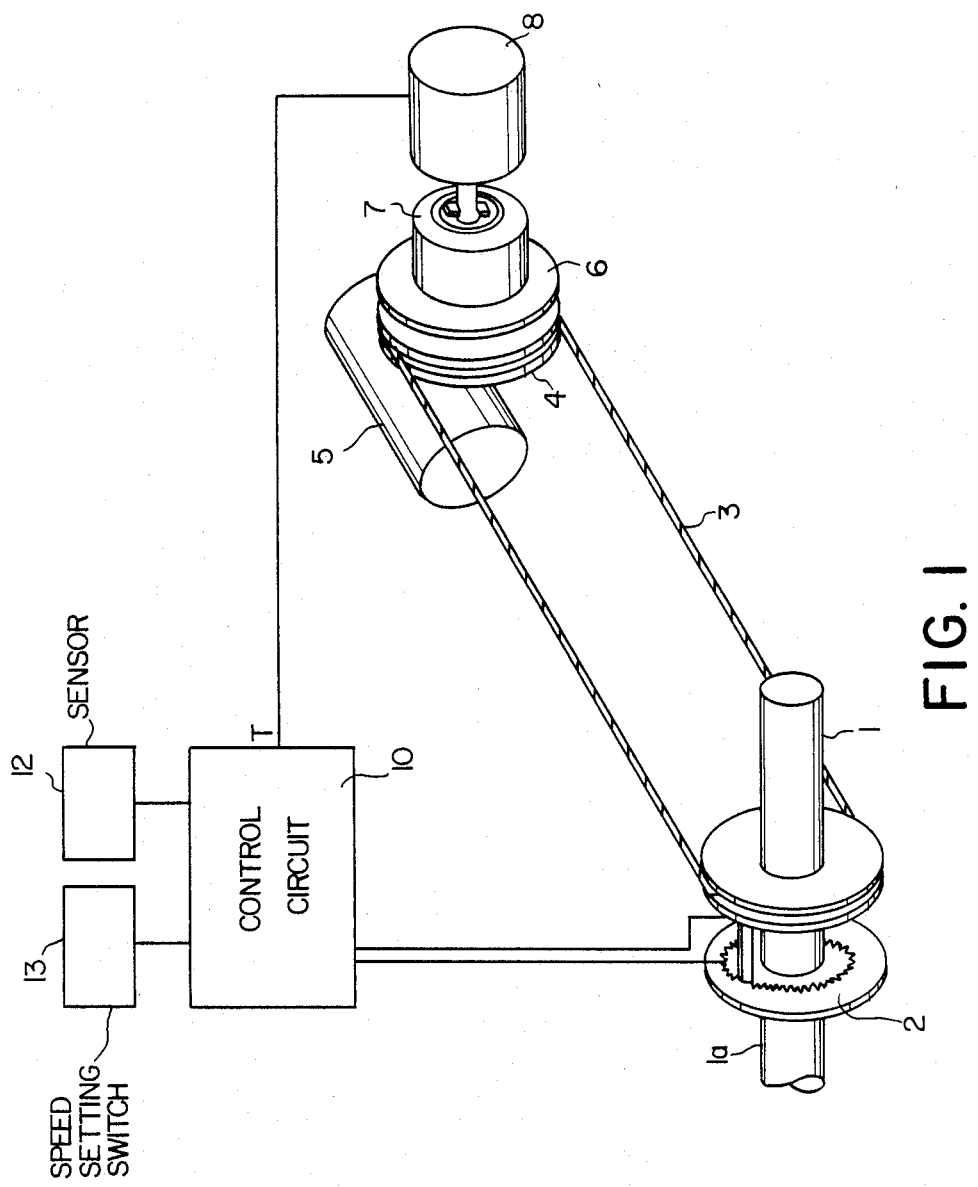
FIGS. 1 and 1a show partly perspective, partly schematic views of the constant speed operation control device for a vehicle according to the present invention.
Figure 1A:
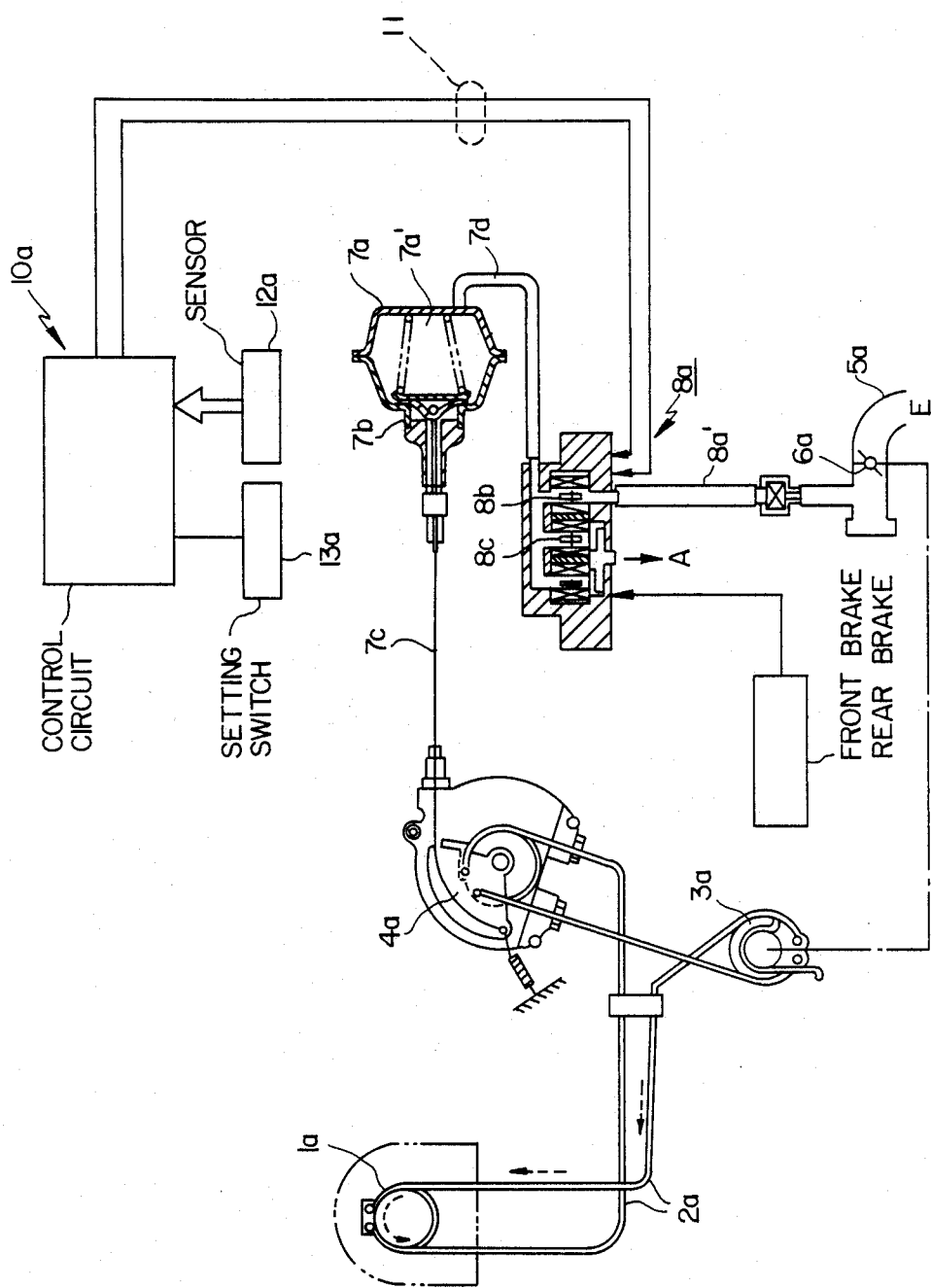

FIG. 1 shows a throttle grip 1 mounted on a handle (not shown), and a potentiometer 2 and a connecting wire 3 are mounted on a rotating shaft 1a of the throttle grip 1. A pulley disc 4 is fixed to a throttle rotating shaft, and the connecting wire 3 is wound around the pulley disc 4. The rotating shaft of the pulley disc 4 extends into a suction port 5 of an engine, and is mechanically connected with a throttle valve 9 (FIG. 2) openably supported. Disc 4 is rotatable by displacement of connecting wire 3 to thereby open and close throttle valve 9. A clutch device 7 having a disc plate 6 is opposed to the disc 4. The clutch device 7 operates to transmit power from a motor 8 to pulley disc 4. As shown in FIG. 2a, when a solenoid 7a of clutch device 7 is excited, a fixed gap is defined between plate 6 and disc 4. When solenoid 7a is de-excited, disc plate 6 is biased toward disc 4 by the operation of a spring 7b in clutch device 7, and is brought into frictional contact with disc 4 (FIG. 2b). Motor 8 is controlled to rotate forwardly and reversely by a predetermined amount on receipt of an output signal T from a control circuit 10 under automatic constant speed operation. The control circuit 10 is provided with various sensors 12 and a setting switch 13 for constant speed operation control. FIG. 1a shows a throttle grip 1a mounted on a handle (not shown) of the motorcycle, and a connecting wire 2a is mounted on a rotating shaft of the throttle grip 1a. The connecting wire 2a is serially wound around a valve link 3a and an opening adjusting mechanism 4a. The valve link 3a mechanically connected with a throttle valve 6a openably supported in a suction port of an engine E, and is adapted to rotate in association with the displacement of the connecting wire 2a to thereby open and close the throttle valve 6a. The opening adjusting mechanism 4a is operated by an air actuator 7a and a valve unit 8a, and is adapted to displace the connecting wire 2a and similarly rotate the link 3a to thereby open and close the throttle valve 6a. That is, the valve link 3a is manually operated by the operation of throttle grip 1a, or is automatically operated by the opening adjusting mechanism 4a according to an automatic control which will be described hereinafter.

The air actuator for operating the opening adjusting mechanism 4a is provided with a pressure chamber 7a' and a diaphragm 7b operable according to the pressure in the pressure chamber 7a'. A connecting rod 7c is connected to diaphragm 7b to operate the opening adjusting mechanism 4a. For instance, when diaphragm 7b is attracted owing to a decrease in pressure (an increase in vacuum) in pressure chamber 7a', connecting rod 7c is retracted to rotate valve link 3a through the opening adjusting mechanism 4a, thereby opening throttle valve 6a and obtaining an accelerating condition. In contrast, when the pressure in chamber 7a' increases to atmospheric pressure A (a reduction in vacuum), diaphragm 7b is returned to its initial position to urge connecting rod 7c. Accordingly, the opening adjusting mechanism 4a as well as valve link 3a are reversely rotated to close throttle valve 6, thereby obtaining a decelerating condition. Air actuator 7a is driven by the pressure to be supplied from a valve unit 8a through a pipe 7d. The valve unit 8a is provided with a vacuum tank 8a' for inducing a vacuum in the suction port 5a of the engine E, a first valve 8b for passing the vacuum therethrough and operating the air actuator 7a so as to provide the accelerating condition, and a second valve 8c for inducing atmospheric pressure A so as to provide the decelerating condition. The opening and closing operation of valves 8b and 8c is carried out according to an output command signal 11 from a control circuit 10.

Figure 3:
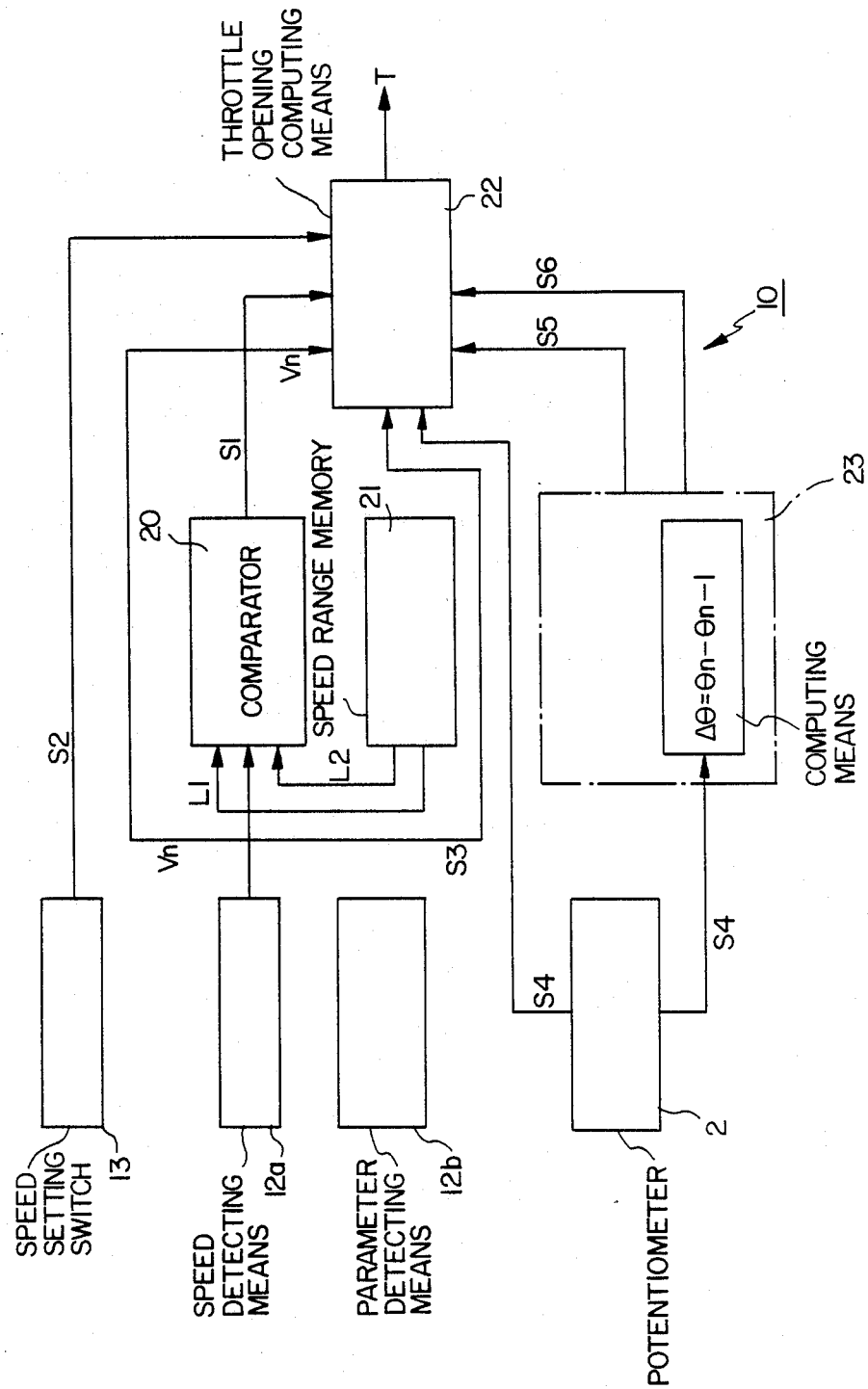
FIGS. 3 and 3a are schematic diagrams of the control circuit for the inventive device.

As shown in FIG. 3, the control circuit 10 includes a comparator 20, a speed range memory 21, a throttle opening computing means 22 and a throttle opening change or knocking condition determining means 23. The comparator 20 forms a determination signal $S_1$ for determining whether or not the constant speed operation control is to be permitted. If an output speed signal $V_n$ from a speed detecting means 12a, which is one of the sensors 12, lies between an upper limit $L_1$ (e.g., 100 km/h) and a lower limit $L_2$ (e.g., 20 km/h) in the speed range memory 21, the comparator 20 determines that constant speed operation control is permissible to generate a permission signal $S_1$. At this time, when the speed setting switch 13 is set under the presence of the permission signal $S_1$, a set signal $S_2$ for constant speed operation is generated. The throttle opening computing means 22 retains the speed signal $V_n$ in its own memory (not shown), provided that the above two signals $S_1$ and $S_2$ are received. The speed signal $V_n$ under the above condition is set at a set speed $V_s$. At the same time, the throttle opening computing means 22 generates a valve opening signal T for attaining the set speed $V_s$, according to operating parameters $S_3$ of the engine system such as an engine speed N and an engine vacuum $P_B$ which are outputted from a parameter detecting means 12b which is one of the sensors 12. As a result, the servo motor 8 is controlled under a predetermined condition, and constant speed operation may be achieved by operation of the motor, the air actuator and the opening adjusting mechanism.

The control circuit 10 is further provided with a means for determining throttle opening change $\Delta\theta_n$ or knocking condition determining means 23 including a low speed determining means 24 and a vacuum determining means 25. The throttle opening change determining means 23 detects an output signal from the potentiometer 2 as a throttle opening signal $\theta_n$, and computes a difference $\Delta\theta_n$ between the present throttle opening signal $\theta_n$ and a previous throttle opening signal $\theta_{n-1}$ at a fixed period of time. The determining means 23 then determines whether or not the direction of the opening change $\Delta\theta_n$ is a throttle closing direction, and whether or not the amount of the change lies between a fixed value $\epsilon_1$ and a fixed value $\epsilon_2$ ($\epsilon_1 \leq \Delta\theta \leq \epsilon_2$). If the above conditions are not satisfied, a command signal $S_5$ for commanding the stopping of the automatic constant speed operating condition is fed to the throttle opening computing means 22 to cut off the throttle opening signal T. Accordingly, normal manual operation is carried out thereafter. The throttle opening change determining means 23 supplies a set speed changing signal $S_6$ for changing a set speed $V_s$ to the throttle opening computing means 22 according to the throttle opening change $\Delta\theta$. The throttle opening computing means 22 then reprograms the set speed stored in the afore-mentioned memory.

The low speed determining means 24 has a minimum set speed permitting automatic constant speed operating control according to the output signal $V_n$ from the speed detecting means 12a on the basis of engine performance. The low speed determining means 24 then monitors whether or not the running speed $V_n$ is near the set speed. The vacuum determining means 25 monitors whether or not the engine vacuum $P_B$ is abnormal, according to a vacuum signal $S_4$ from the parameter detecting means 12b. In this manner, when a precursor of knocking due to abnormal fluctuation in engine vacuum or the generation of knocking due to an increase in engine vacuum during running at low speeds is detected by the low speeds is detected by the low speed determining means 24 and the vacuum determining means 25, the knocking condition determining means 23 generates a command signal $S_5$ for commanding the stoppage of the automatic constant speed operating condition to the throttle opening computing means 22, and cuts off the throttle opening signal T. Normal manual running is thereafter carried out. Further, the determination of the knocking condition by the knocking condition determining means 23 may be effected according to not only vacuum but also various parameters or the combination thereof. Although the knocking condition determination means is constituted of the low speed determining means 24 and the vacuum determining means 25, a knocking sensor 26 (FIG. 2) may be used to directly detect the knocking condition.

Figure 4:
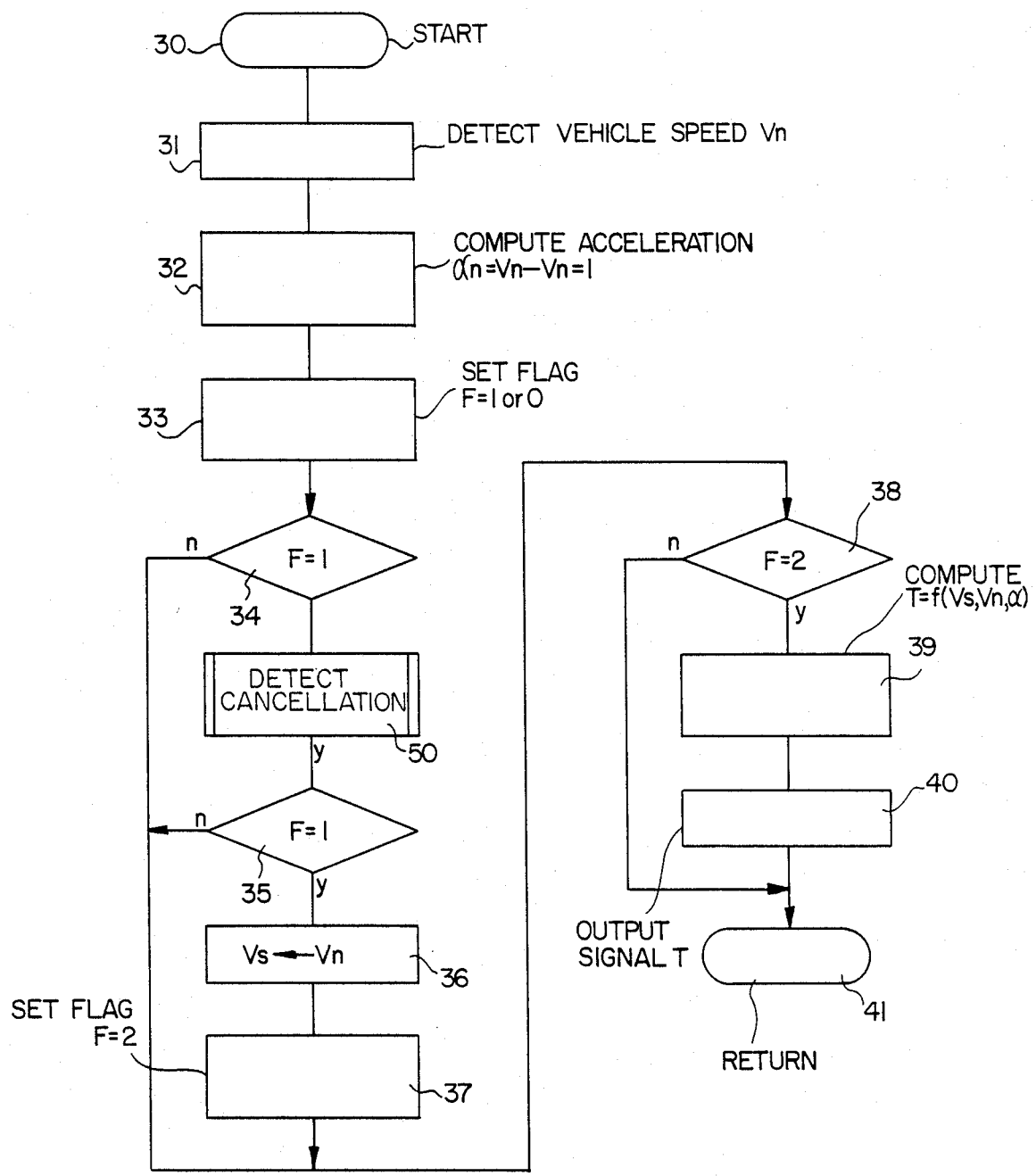
FIG. 4 is a flow chart showing the main operation of the device.

There will next be described the operation of the preferred embodiment with reference to the flow charts shown in FIGS. 4 and 5. In the following description, reference numerals 30 to 57 correspond to the block numbers in the flow charts, and reference numeral 34y or 34n, for example, means that the determination in block 34 is YES or NO, respectively.

When the signal $S_2$ is generated by turning on the speed setting switch 13, and the output signal $S_1$ from the comparator 20 is also present, the throttle opening computing means 22 is operated to start an automatic constant speed operation routine (30). Thereafter, the throttle opening computing means 22 detects the operating speed $V_n$ during a fixed period (31), and computes an acceleration $\alpha_n$ from the present running speed $V_n$ and a previous running speed $V_{n-1}$ (32). Further, whether or not automatic constant speed operation is required is registered by a flag resistor (not shown) in the throttle opening computing means 22. If the setting switch 13 requiring automatic constant speed operation is on, a flag F is set to F=1, while if the switch 13 is off, the flag F is set to F=0 (33). Further, the flag resistor includes a flag F=2 for identifying that the automatic constant speed operating condition has been effected, as will be described hereinafter.

Identification of the flag F is then executed (34), and, if the flag is identified as F=1 (requirement of automatic constant speed operation) (34y), a sub-routine 50 for determining whether or not the automatic constant speed operating condition is to be cancelled. Such automatic constant speed operating condition cancelling sub-routine 50 will be described hereinafter. After execution of the sub-routine 50, the flag F is identified again (35), and if F=1 (requirement of automatic constant speed operation) is effective (35y), the running speed $V_n$ stored in the above-mentioned memory (not shown) of the throttle opening computing means 22 is defined as a set speed (target speed) $V_s$ (36), thereby permitting reading of the running speed $V_n$ from the memory. Thus, the automatic constant speed operating condition has been effected, and the flag F is therefore set to F=2 (37). Identification of the automatic constant speed operating condition is then executed (38), and if the flag F=2 is identified (38y), the throttle opening computing means 22 computes the throttle opening signal T for attaining a throttle opening corresponding to the target speed $V_s$ according to the acceleration $\alpha_n$ and the detection signal $S_3$ from the parameter detecting means 12b (39), and then generates the signal T (40). One cycle of the processing is then ended (41). Further, if the flag F=0 is identified, the determination in each of the determination blocks 34, 35 and 38 is NO (34n, 35n, 38n), and the routine is ended at once in each case (41).

The operation of a preferred embodiment will now be described in more detail with reference to FIGS. 3a and 5, in explanation of the sub-routine 50 for determining whether or not the automatic constant speed operating condition is to be cancelled.

Figure 3A:
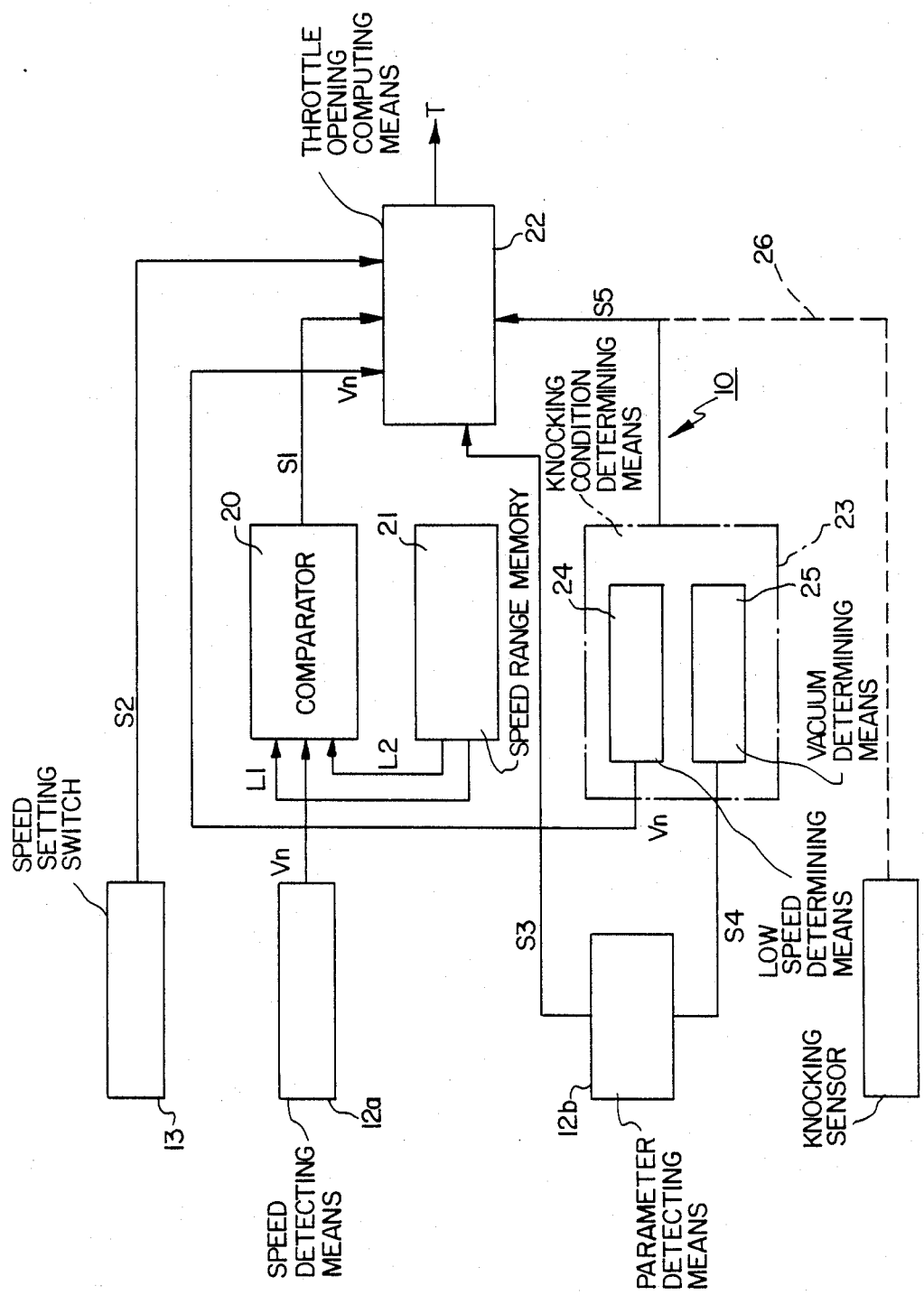

With respect to FIG. 3a, when the sub-routine 50 is started, the knocking condition determining means 23 reads the detection signal V from the speed detecting means 12a and the detection signal $S_4$ from the parameter detecting means 12b, and monitors each parameter (51). A predetermined computation is then executed according to the parameter (52), and it is determined whether or not the knocking condition computed above falls under a predetermined knocking condition (53). If it does not, the sub-routine is ended (55), and is returned to the automatic constant speed operating routine shown in FIG. 4. If the knocking condition falls under the predetermined knocking condition (53y), the flag is converted to forcibly obtain the flag F=0 (54). The sub-routine is then ended to be returned to the automatic constant speed operating routine shown in FIG. 4. As a result, no processing is executed in each of the flag determination blocks 35 and 38 in the automatic constant speed operating routine shown in FIG. 4, and the automatic constant speed operating routine is ended (41). Accordingly, the automatic constant speed operating condition is cancelled.

Figure 5:
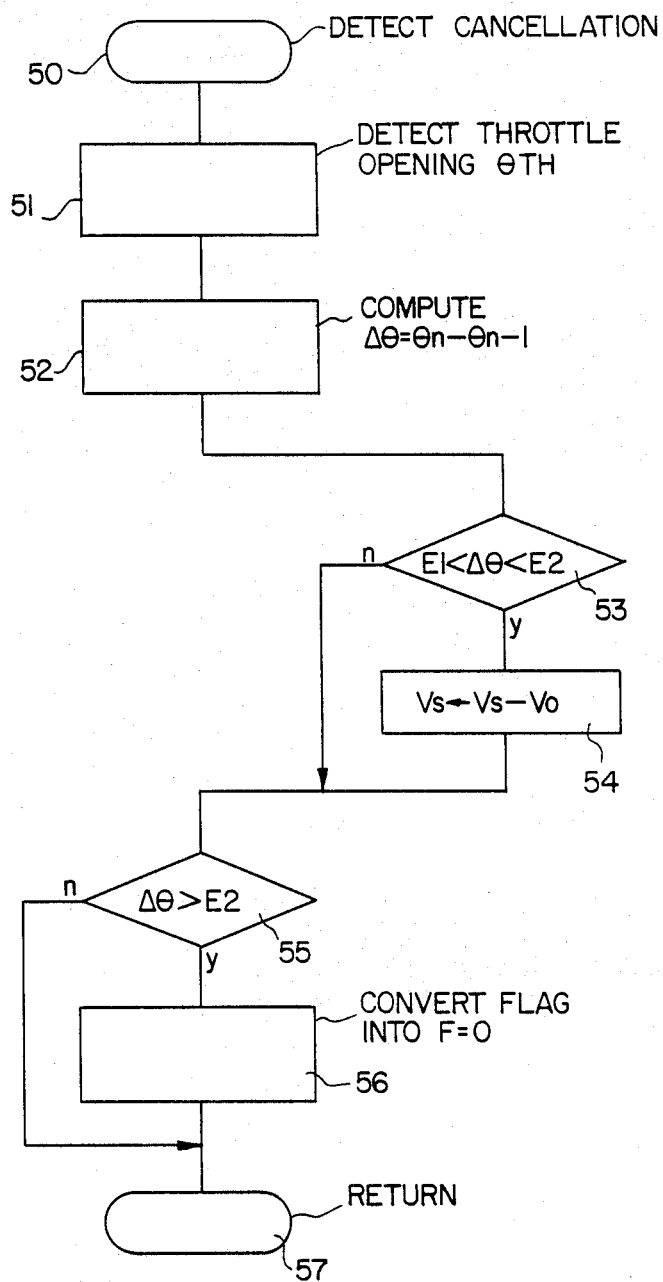
FIGS. 5 and 5a are flow charts showing the operation of cancelling the automatic constant speed operation.
Figure 5A:
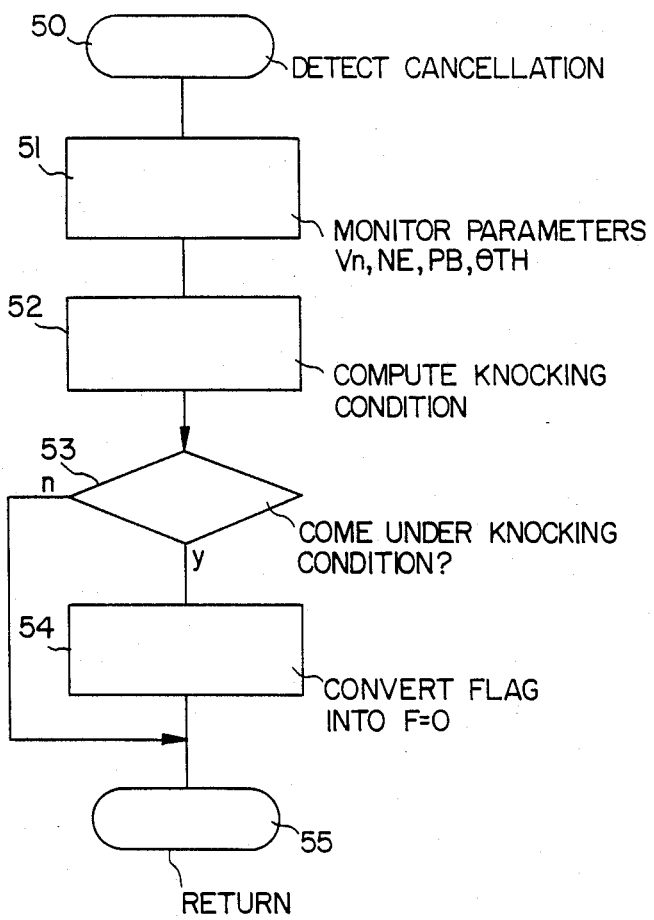

With respect to FIG. 5, when the sub-routine 50 is started, the throttle opening change determining means 23 reads the detection signal $S_4$, and detects the throttle opening $\theta_n$ (51). The detection value $\theta_n$ is compared with the previous detection value $\theta_{n-1}$ stored in the memory of the determining means 23, and the difference signal $\Delta\theta = \theta_n - \theta_{n-1}$ is computed (52). The difference signal $\Delta\theta$ is compared with the set values $\epsilon_1$ and $\epsilon_2$, and it is determined whether or not $\Delta\theta$ satisfies the condition of $\epsilon_1 \leq \Delta\theta \leq \epsilon_2$ (53). If the throttle opening change $\Delta\theta$ satisfies $\epsilon_1 \leq \Delta\theta \leq \epsilon_2$ (53y), a decelerating condition within a fixed range is determined. Therefore, the throttle opening change determining means 23 generates the set speed changing command $S_6$, and changes the set speed $V_s$ into $V_s - V_o$. The speed $V_o$ is an amount corresponding to the throttle opening change $\Delta\theta$. On the other hand, if the throttle opening change $\Delta\theta$ does not satisfy $\epsilon_1 \leq \Delta\theta \leq \epsilon_2$ (53n), the changing of the set speed (54) is not executed, but it is determined whether or not the throttle opening change is greater than the fixed value $\epsilon_2$ ($\Delta\theta > \epsilon_2$), i.e., whether the deceleration rate is greater than a fixed value (55). If $\Delta\theta > \epsilon_2$ is not satisfied (55n), the processing is ended at once (57) to be returned to the automatic constant speed operating routine shown in FIG. 4. On the other hand, if $\Delta\theta > \epsilon_2$ is satisfied (55y), abnormal deceleration is determined, and the flag is converted to forcibly obtain the flag F=0 (56). Then, sub-routine 50 is ended (57), to be returned to the automatic constant speed operating routine shown in FIG. 4. As a result, no processing is executed in each of the flag determination blocks 35 and 38 in the automatic constant speed operating routine shown in FIG. 4, and the automatic constant speed operating routine is ended (41). Accordingly, the automatic constant speed operating condition is cancelled. Such abnormal deceleration is generated when the throttle grip 1 is operated in an emergency, for example, during automatic constant speed operation. I.e., since the contact of the clutch device 7 with the disc 4 is maintained by frictional force only, throttle operation is permitted in the case of forcibly operating the throttle grip 1 during automatic constant speed operation.

Further, when the throttle opening change $\Delta\theta$ is negative, i.e., when the motorcycle is accelerating rather than decelerating, neither condition of $\epsilon_1 \leq \Delta\theta \leq \epsilon_2$ in determination block (53n) nor the condition of block (55) is satisfied, and the processing in this routine is ended at once (57).

Figure 6:
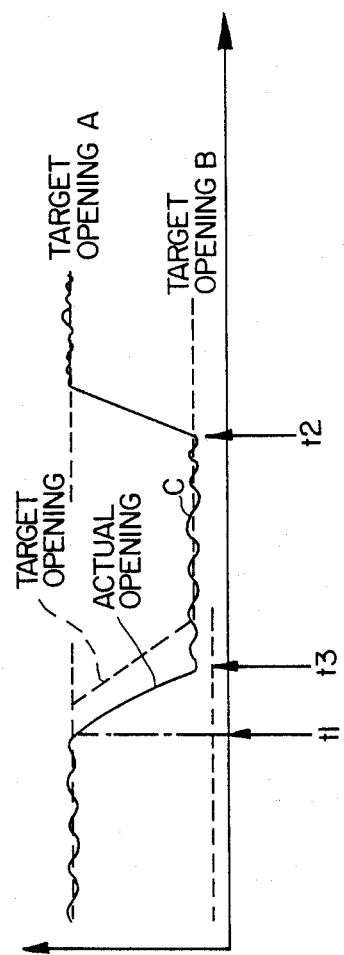
FIG. 6 is a graph showing the operation of the control device according to the invention.

FIG. 6 is a conceptional illustration of the abovementioned operation. Initially, the vehicle is in the automatic constant speed operating condition, a throttle opening A corresponding to a target speed being maintained. At a time $t_1$, deceleration starts. If the rate of acceleration lies within a permissible range, the target speed is changed to a new target speed. The automatic constant speed operating condition is then continued with a throttle opening B corresponding to the new target speed. When the vehicle is accelerated at a time $t_2$, the target speed may be changed again. Thus, while a target throttle opening C is shown in a dotted line, an actual throttle opening D is shown in a solid line. However, when the throttle opening change becomes greater than a fixed value during the period from the time $t_1$ to $t_3$, the automatic constant speed operation is stopped at this timing.

According to the invention, the constant speed operating control is cancelled only when the movement of the throttle grip in the direction of deceleration per unit time is great or in case of irregular combustion such as knocking during low speed operation. I.e., the automatic constant speed operating condition may be maintained even when the vehicle runs at low speeds in any cases other than the above. Therefore, it is possible to provide a constant speed operating control device which may effect automatic constant speed control down to a low speed engine performance.

What is claimed is:

1. In a constant speed operation control device for a vehicle, said device being adapted to determine an opening of an engine throttle according to an output command signal from a control circuit and to maintain a vehicle operating speed at a fixed set value, the improvement comprising means in said control circuit for cancelling an automatic constant speed operating condition when a throttle opening change in a closing direction of said engine throttle within a fixed period of time is greater than a predetermined value.

2. In a constant speed operation control device for a vehicle, said device being adapted to determine an opening of an engine throttle according to an output command signal from a control circuit and to maintain a vehicle operating speed at a fixed set value, the improvement comprising means in said control circuit for monitoring said vehicle operating speed and operation parameters of an engine system, and means for discontinuing to supply said command signal so as to cancel an automatic constant speed operating condition in the event of irregular combustion of said engine system at low operating speeds.

* * * * *